Dec. 6, 1955   T. B. CLINE ET AL   2,725,591
MACHINE FOR REMOVING SAUSAGE CASING
Filed Dec. 6, 1952   2 Sheets-Sheet 1
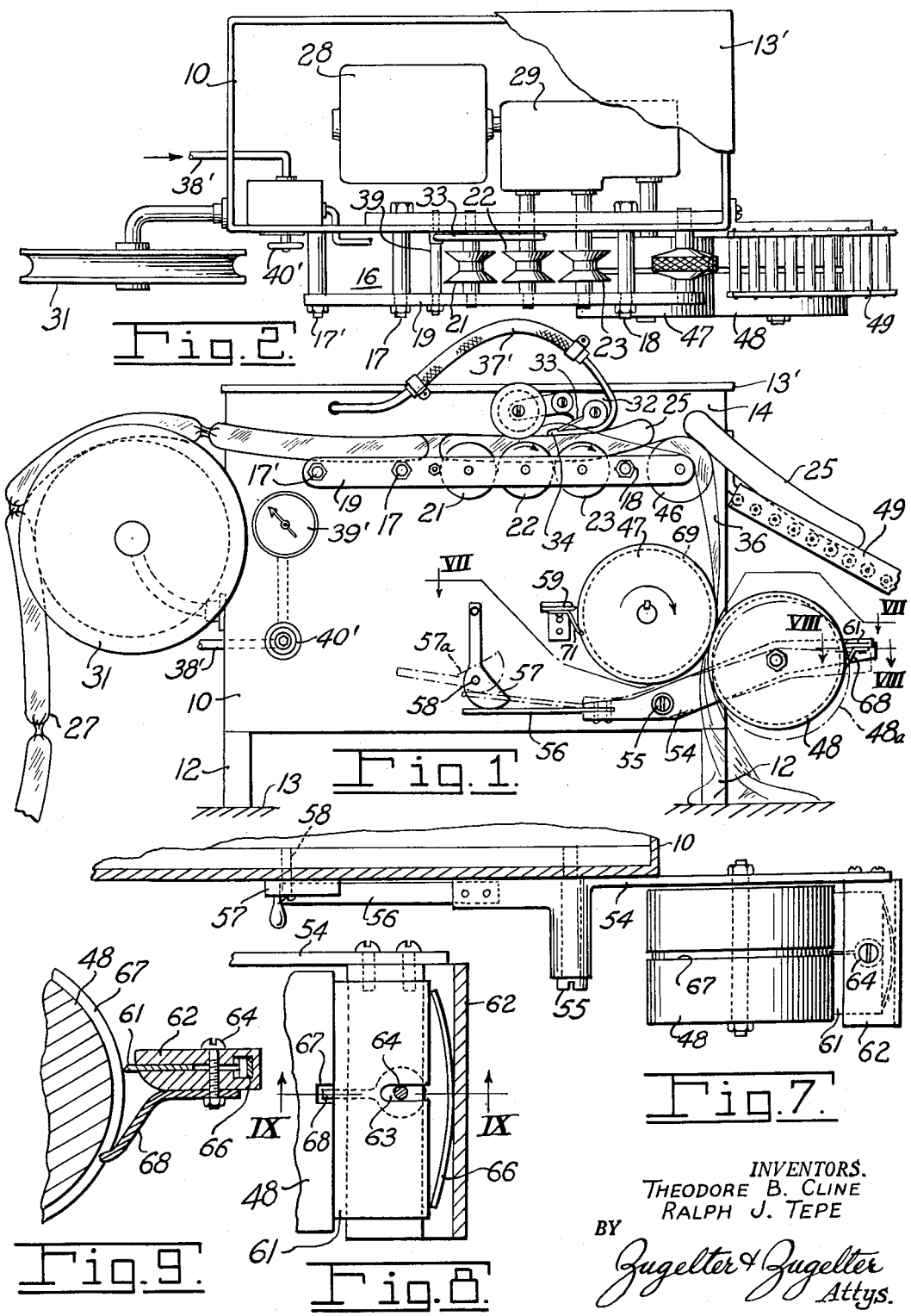
INVENTORS.
THEODORE B. CLINE
RALPH J. TEPE
BY
Zugelter & Zugelter
Attys.

Dec. 6, 1955 T. B. CLINE ET AL 2,725,591
MACHINE FOR REMOVING SAUSAGE CASING
Filed Dec. 6, 1952 2 Sheets-Sheet 2
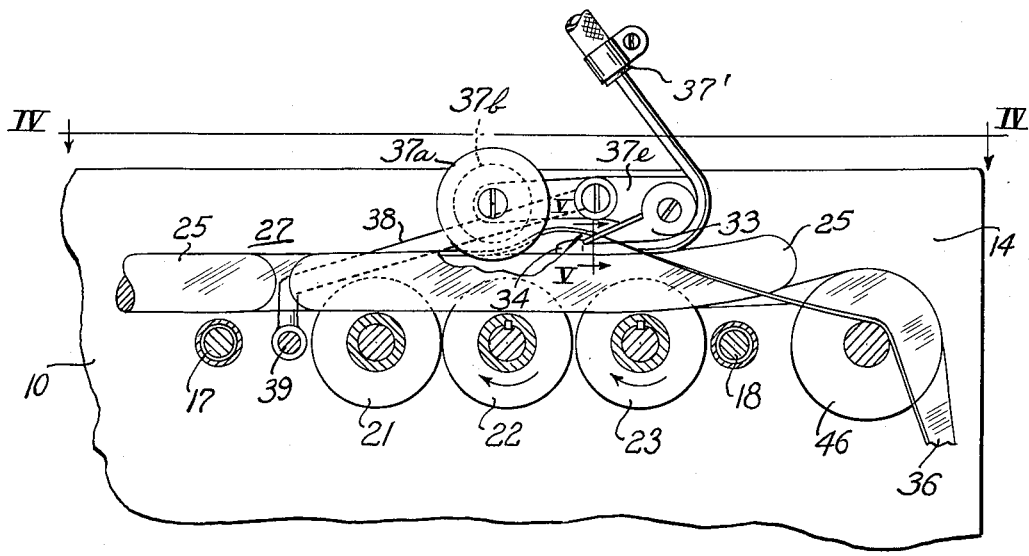
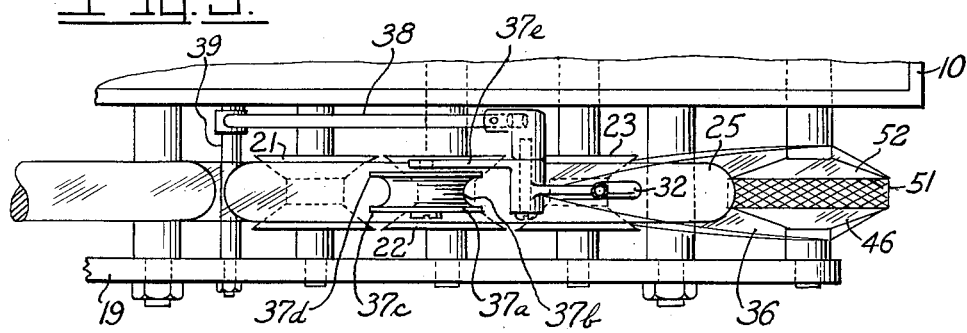
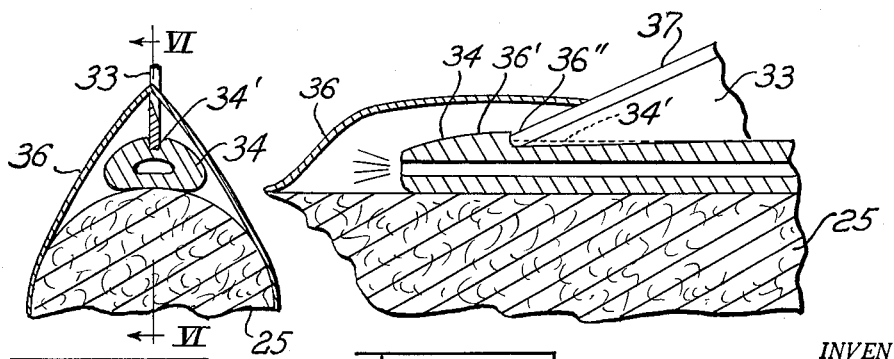
INVENTORS.
THEODORE B. CLINE
RALPH J. TEPE
BY
Zugelter & Zugelter
Attys.

United States Patent Office 2,725,591
Patented Dec. 6, 1955

2,725,591

MACHINE FOR REMOVING SAUSAGE CASING

Theodore B. Cline and Ralph J. Tepe, Sycamore Township, Hamilton County, Ohio

Application December 6, 1952, Serial No. 324,492

2 Claims. (Cl. 17—1)

This invention relates to a machine for stripping a casing from sausages.

An object of this invention is to provide a machine which pneumatically separates the casing of a sausage or wiener and cuts the casing lengthwise so that the casing can be skinned from a string of sausages without injury thereto.

A further object of this invention is to provide a machine having a nozzle for directing compressed air into the casing to separate the casing from the meat therein sufficiently so that the casing may be slit lengthwise without damaging or marking the skinned meat.

A further object of this invention is to provide a machine having an air nozzle which separates the casing from the sausages and a knife mounted on or adjacent the nozzle for slitting the casing as the string of sausages is moved past the nozzle and knife.

A further object of this invention is to provide a machine of this type having means for continuously slitting and removing the slit casing from the sausages as the sausages travel through the machine.

The above and other objects and features of the invention will in part be apparent and will in part be obvious from the following detailed description, and the drawing, in which:

Figure 1 is a view in side elevation showing a machine constructed in accordance with an embodiment of this invention with a string of sausages therein;

Fig. 2 is a plan view of the machine illustrated in Fig. 1, the cover thereof being removed, the casing slitting device of the machine being broken away for clarity;

Fig. 3 is an enlarged view partly in side elevation and partly in section of the nozzle, knife, and sausage-supporting rolls of the machine illustrated in Fig. 1;

Fig. 4 is a view in section taken along a line IV—IV in Fig. 3;

Fig. 5 is a view in section taken along a line V—V in Fig. 3;

Fig. 6 is a view in section taken along a line VI—VI in Fig. 5;

Fig. 7 is a view in section taken along a line VII—VII in Fig. 1;

Fig. 8 is a view in section taken along a line VIII—VIII in Fig. 1; and

Fig. 9 is a view in section taken along a line IX—IX in Fig. 8.

In the following detailed description, and the drawings, like reference characters indicate like parts.

As illustrated in Figs. 1 and 2, the machine includes a box-like frame 10 and supporting legs 12. The machine may be placed on an appropriate bench 13 or the like (not shown in detail). The box 10 is closed by a cover 13' during use of the machine. The frame 10 has a front face plate 14 by which a roller supporting frame 16 is supported. The roller frame 16 comprises bolts 17, 17', and 18 mounted in face plate 14 and an elongated outer frame member 19 which spans the bolts 17' and 18. Sausage-guiding rolls 21, 22 and 23 (see Figs. 3 and 4) are carried by the framework 16. The rolls 21, 22 and 23 are grooved or spool-shaped, so that a string of sausages 25 will be properly guided thereby. As shown in Fig. 2, roll 21 is an idle roll and guides the string 27 of sausages to rolls 22 and 23, while rolls 22 and 23 are driven rolls.

Rolls 22 and 23 are driven in the direction indicated by the arrows in Figs. 1 and 3, so that, when the machine is in operation, the string 27 of encased sausages will be fed to the right, as indicated in Fig. 1. Rolls 22 and 23 are driven by an electric motor 28 mounted inside the box frame 10. The motor 28 drives appropriate gearing (not shown in detail) in a gear box 29.

The string 27 of sausages enters the machine over an enlarged grooved idle roll 31 (Fig. 1) and passes from roll 31 to the aforementioned rolls 21, 22 and 23. A casing-slitting device 32 is mounted above the driven rolls 22 and 23. The casing-slitting device comprises a knife 33 and a nozzle 34. As shown in Figs. 5 and 6, the knife 33 is mounted edgewise in a groove 34' on top of nozzle 34. The underside of nozzle 34 is concave upwards, as shown in Fig. 5 and forms a skid member which is adapted to ride on and be supported by the sausages 25, that is, the sausages have sliding contact with the nozzle skid member. The nozzle 34 leads the knife and extends inside the casing 36 of the string of sausages. Compressed air is discharged into the casing through nozzle 34, whereby the casing is separated from the sausage meat a sufficient distance, as indicated in Fig. 6, so that the knife 33 can slit the casing 36 as the string of sausages is moved over the nozzle and knife. As shown, the tip 36' of the nozzle is ungrooved and the point 36" of knife 33 is behind the tip 36' to prevent snagging of the casing by the knife. The blade 37 of the knife slopes upwardly from the nozzle 34.

As shown, the casing-slitting device is supported by a wheel 37a. Wheel 37a rests on the sausages as the string of sausages is advanced through the machine. The face of the wheel 37a is concave as indicated at 37b so that the air bubble formed by air injected into the casing through nozzle 34 can pass along the casing below the wheel 37a and wheel 37a rides on rims 37c and 37d. Wheel 37a is journaled on an arm or head member 37e. Arm 37e in turn is attached to a tube or hose 37' which supplies air to nozzle 34. Arm 37e is pivotally attached to a crank arm or lever 38. Crank arm 38 swings on a pivot 39 so that the wheel 37a and nozzle 34 are supported on the sausages.

The nozzle 34 receives air through tube 37' (Fig. 3) as already pointed out. Tube 37' is connected to a supply pipe 38' in which is a gauge 39' and a manual control valve 40 (not shown in detail).

After the casing has been slit by knife 33 the casing passes over an idle roll 46. From roll 46 the casing 36 passes between engaging rolls 47 and 48 while the sausages 25 are discharged down a conveyor 49. The roll 47 is driven in the direction indicated by the arrow in Fig. 1 by means of motor 28 and gearing in gear box 29. The rolls 47 and 48 pull the casing downwardly and away from the sausages 25 to free the sausages and, as the casing is pulled from the sausages, the sausages are discharged over idle roll 46 onto conveyor 49. The rolls 47 and 48 may be faced with rubber-like grease-resistant material such as the synthetic material known as neoprene. The idle roll 46, as shown most clearly in Figs. 2 and 4 is of truncated diamond shape in section, and is narrow at its outer edge 51 and substantially wider at the axle thereof. The narrow outer edge 51 is knurled, as indicated, to cause the idle roll 46 to turn with the casing. As the casing leaves the sausages, the casing is folded onto the sloping sides 52 of roll 46 as indicated in Fig. 4 with the sausage engaging face out so that the casing is smoothly separated from the sausages. As shown in Fig. 4, the sides 52 of the idle roll 46 slope at an angle of approximately 70 degrees to the axis thereof and the idle roll 46 is of a sufficient diameter that nearly the entire width of the casing is received thereon.

During operation of the machine, rolls 47 and 48 are in engagement to pull the casing away from the sausages as the casing is slit. Roll 48 can swing away from roller 47 to the position indicated in dot-dash lines at 48a. Roller 48 is carried by a lever 54. Lever 54 swings on a pivot 55. The left hand end of lever 54 carries a cantilever type flat spring 56. Spring 56 is engaged by a cam 57. Cam 57 swings on its pivot 58 between the position shown in full lines in which the roll 48 is held against roll 47 and a released position indicated in dot-dash lines at 57a in which the roll 48 can swing away from roll 47 to the position 48a.

The rolls 47 and 48 are provided with scraper blades 59 and 61, respectively, to free the casing from the rolls if the casing starts to stick to one of the rolls. Blade 59 is mounted on face plate 14 while blade 61 is mounted on lever 54. The blades and mountings are similar and only blade 61 and its mounting will be described in detail. As shown in Figs. 7, 8, and 9, blade 61 is mounted in a housing 62. The blade 61 is slotted as indicated at 63, and a bolt 64 which passes through slot 63 keeps the blade centered in housing 62. A spring 66 urges the blade into engagement with the roll 48, as shown in Fig. 9.

Roll 48 is provided with a groove 67. A scraper finger 68 projects into groove 67. The finger 68 is adapted to keep the casing from sticking to the roll 48 and guide any portion of the casing which may stick away from roll 48. Roll 47 is provided with a similar groove 69 and a scraper finger 71 for keeping the casing from sticking to roll 47.

The operation of the machine will be clear from the foregoing detailed description and the drawings. When the machine is to be used, a string of sausages 25 encased in an elongated casing 36 is mounted on the machine in the position indicated in Fig. 1. The casing employed is one which is sufficiently yieldable that, when air under pressure is forced into the casing, the casing can separate slightly from the sausages, as indicated in Figs. 3 and 6. The casing is slit by hand at the first sausages of the string so that the end of the casing can be inserted between rolls 47 and 48, with the nozzle 34 inside the casing. Then the motor 28 is started so that the string of sausages is moved past the knife and blade, whereupon the knife automatically slits the casing lengthwise thereof and the rolls 47 and 48 pull the casing away from the sausages so that the sausages can be discharged down conveyor 49.

The machine illustrated in the drawings and described above is subject to structural modification without departing from the spirit and scope of the appended claims.

Having described our invention, what we claim as new and desire to secure by Letters Patent is:

1. A machine for slitting and removing casing from linked meat products such as wieners, sausage and the like, comprising a conveyor for propelling linked meat products tandemwise, a lever pivotally mounted at one end thereof on the machine and having a head member pivotally mounted on the other end thereof, a means on the head member on one side of the pivot thereof for exerting hold-down pressure on each link passing under the same, a casing separator and knife assembly mounted on said head on the other side of the pivot thereof and located to the rear of said hold-down pressure means, said assembly comprising a skid member having a flow passage therein terminating in a discharge nozzle located relatively close to the rear of said hold down pressure means and forward of its pivotal support, said skid member sliding on the skinned meat links and being adapted to have its flow passage connected to a supply of compressed air which, when it discharges from the nozzle, enters between the casing and the meat product thereby separating the casing and lifting the same above the skid member as the links pass under and to the rear of the hold down pressure means, and a knife blade mounted on top of said skid member, said blade having a cutting edge that slopes downwardly towards the top of the nozzle to substantially the upper surface of the skid member.

2. A machine for separating and removing casings from linked meat products which comprises a substantially horizontal conveyor, means for drawing a string of encased sausages along the conveyor, an elongated crank pivotally mounted at one end thereof on the machine and having its opposite end disposed above the conveyor, a head member pivotally mounted on said opposite end of the crank, a head support mounted on the head member on one side of the pivot thereof for exerting hold-down pressure on each link passing under the same, a nozzle mounted on said head member on the other side of the pivot, a skid member on the underside of the nozzle for sliding on skinned meat links to support the nozzle thereon with the nozzle extending into the casing, means for projecting a fluid under pressure through the nozzle into the casing to separate the casing from the links, and a knife blade supported on the upper side of the nozzle for slitting the separated casing.

References Cited in the file of this patent

UNITED STATES PATENTS

| | | |
|---|---|---|
| 2,340,755 | Jacobson | Feb. 1, 1944 |
| 2,369,360 | Martin | Feb. 13, 1945 |
| 2,424,346 | Wilcoxon | July 22, 1947 |
| 2,514,660 | McClure et al. | July 11, 1950 |
| 2,623,237 | Schaller | Dec. 30, 1952 |
| 2,630,598 | Grey | Mar. 10, 1953 |